United States Patent
Fender

(10) Patent No.: US 8,190,418 B1
(45) Date of Patent: May 29, 2012

(54) PRODUCING INTEGRATED CIRCUITS WITH TIME-DEPENDENT-IMPEDANCE ELEMENTS

(75) Inventor: Joshua David Fender, East York (CA)

(73) Assignee: Altera Corporation, San Jose, CA (US)

( * ) Notice: Subject to any disclaimer, the term of this patent is extended or adjusted under 35 U.S.C. 154(b) by 532 days.

(21) Appl. No.: 12/407,770

(22) Filed: Mar. 19, 2009

(51) Int. Cl.
*G06F 17/50* (2006.01)

(52) U.S. Cl. .......................................... 703/14

(58) Field of Classification Search .............. 703/14
See application file for complete search history.

(56) References Cited

U.S. PATENT DOCUMENTS

| | | | |
|---|---|---|---|
| 5,566,083 A * | 10/1996 | Fang | 703/4 |
| 6,941,258 B2 * | 9/2005 | Van Heijningen et al. | 703/16 |
| 7,191,414 B1 * | 3/2007 | Croix | 716/113 |
| 7,367,000 B2 * | 4/2008 | Kurihara et al. | 716/115 |
| 7,395,192 B2 * | 7/2008 | Kwon et al. | 703/2 |
| 7,983,880 B1 * | 7/2011 | Fender et al. | 703/2 |
| 2009/0234602 A1 * | 9/2009 | Kashiwakura | 702/65 |

OTHER PUBLICATIONS

I. S. Stievano, "On the Behavioral Modeling of Integrated Circuit Output Buffers", 2003.*

Ambrish K. Varma, "Improving Behavioral IO Buffer Modeling Based on IBIS", IEEE 2008.*
Ambrish Kant Varma, "Improved Behavioral Modeling Based on the Input Output Buffer Information Specification", Thesis 2007.*

* cited by examiner

*Primary Examiner* — David Silver
*Assistant Examiner* — Angel Calle
(74) *Attorney, Agent, or Firm* — Womble Carlyle Sandridge & Rice LLP

(57) ABSTRACT

Methods, systems and computer programs for producing integrated circuits (IC) that contain an electronic component with time-dependent impedance are provided. According to one method, time-dependent impedance values for the electronic component are obtained. These time-dependent impedance values are time-dependent because they can change over time, such as when an input/output buffer starts switching, and are used to create a model of the electronic component. The model includes a variable impedance and a variable voltage source. The model is created by calculating a current through the variable impedance and then assigning the obtained impedance values to the impedance. Additionally, values are assigned to the variable voltage source such that the current through the variable impedance with the new assigned values is equal to the current thorough the variable impedance before the assignment of the time-dependent impedance values. Results from multiple simulations of the IC are compared to select the IC layout that generates the lowest noise profile and the IC is produced with the selected layout.

20 Claims, 10 Drawing Sheets

V        R        (Prior Art)

PRODUCING INTEGRATED CIRCUITS WITH TIME-DEPENDENT-IMPEDANCE ELEMENTS

BACKGROUND

The present invention relates to methods, systems and computer programs for producing integrated circuits (IC) that contain non-linear devices, and more specifically for producing ICs by simulating the performance of an IC that includes a time-dependent-impedance component.

Simultaneous switching noise (SSN) is defined as a noise voltage induced onto a single victim Input/Output (I/O) pin of an electronic component due to the switching behavior of other aggressor I/O pins in the device. This noise is considered in the context of either an output I/O driver victim or an input I/O buffer victim. Noise injected onto the pin of an output buffer will be attenuated by the effects on the connected transmission line, termination network, and receiver load. The shape of this noise pulse at the receiver, the far-end, is critical when considering SSN effects on output buffers. This far-end pulse can cause timing and voltage level errors.

Using linear superposition methods in performance simulations allows the SSN on a victim pin to be calculated through the superposition of many short simulations, each composed of a single aggressor pin switching. In some cases, linear superposition simulation techniques can be applied to non-linear systems and still yield good accuracy while improving the simulation time required. An example of this is the QUARTUS™ SSN Analyzer that uses superposition to model SSN caused by non-linear I/O buffers. While this model is quite accurate for many I/O configurations, the accuracy of the model decreases for slow slew rate standards due to the increased non-linearity of a slow switching I/O buffer.

It is in this context that embodiments of the invention arise.

SUMMARY

Embodiments of the present invention provide methods, systems and computer programs for producing integrated circuits (IC) that contain an electronic component with time-dependent impedance. According to one method, impedance values for the electronic component are obtained. The time-dependent impedance values change over time, such as when an input/output buffer starts switching. The obtained impedance values are used to create a model of the electronic component within the IC. The model includes a variable impedance and a variable voltage source connected in series. To create the model, the method includes operations to assign the obtained impedance values to the variable impedance, and to assign values to the variable voltage source, such that a current through the variable impedance is equal to the current thorough the variable impedance before the assignment of the time-dependent impedance values. The method also provides for executing multiple complete simulations of the IC using the model. Each of the multiple complete simulations has a corresponding IC layout or configuration. The IC layout that generates the lowest noise for the IC is selected and used to produce the IC.

It should be appreciated that the present invention can be implemented in numerous ways, such as a process, an apparatus, a system, a device or a method on a computer readable medium. Several inventive embodiments of the present invention are described below.

In another embodiment, an IC is designed by performing a method. In one operation of the method, a model of an electronic component in the IC is created. The model includes a variable impedance and a variable voltage source. In another operation, values are assigned to the variable impedance and to the variable voltage source, such that current through the variable impedance has a predetermined value. Further, the method executes a first simulation of the IC using the model and a first configuration of the IC, as well as a second simulation of the IC using the model and a second configuration. The results from the simulations are examined and a design for the IC is selected based on results from the first and second simulations. In yet another embodiment, a computer program executes the operations of the method.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe methods, systems and computer programs for designing integrated circuits (IC) that contain an electronic component with time-dependent impedance. It will be obvious, however, to one skilled in the art, that the present invention may be practiced without some or all of these specific details. In other instances, well known process operations have not been described in detail in order not to unnecessarily obscure the present invention.

Figure 1:
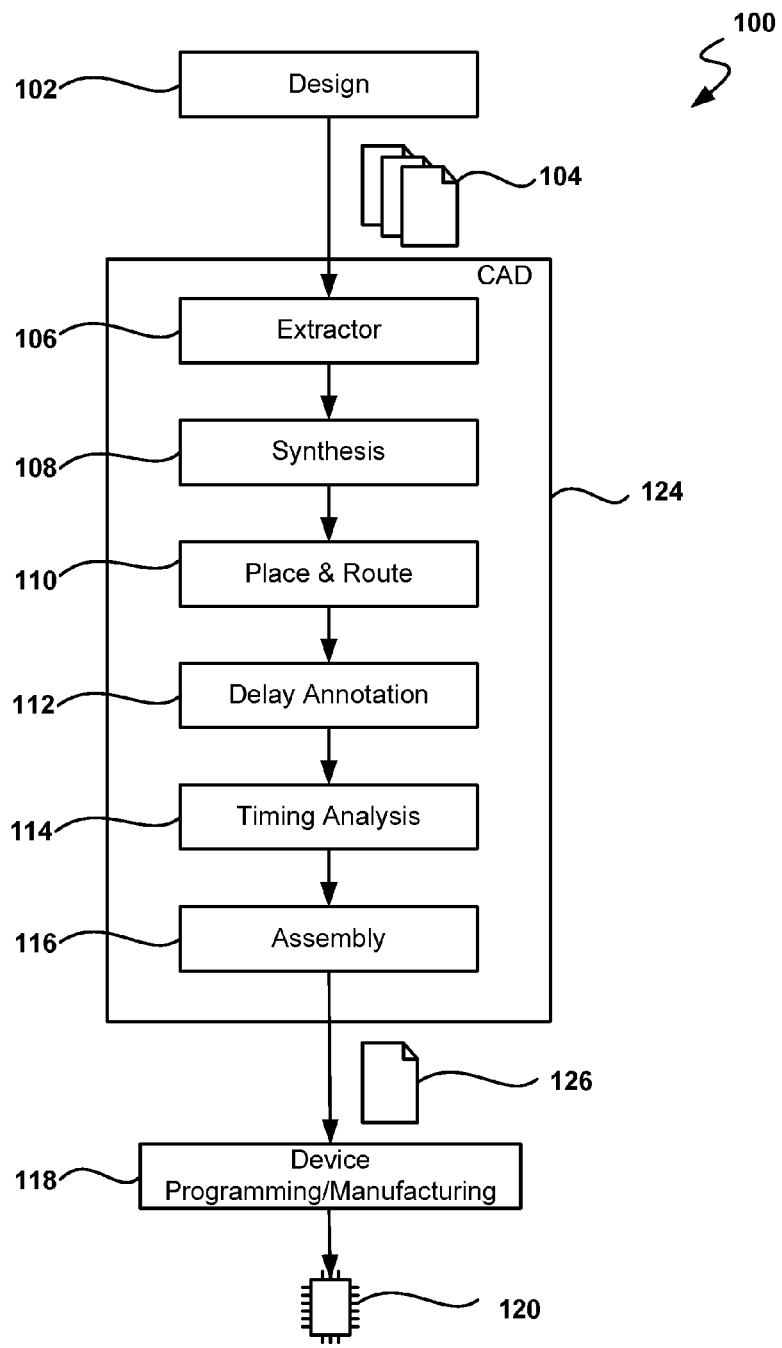
FIG. 1 depicts the method operations required to program or manufacture an Integrated Circuit (IC) using a Computer Aided Design (CAD) tool in accordance with one embodiment of the invention.

FIG. 1 depicts the method operations required to program or manufacture an Integrated Circuit (IC) using Computer Aided Design (CAD) tool 124 in accordance with one embodiment of the invention. The process starts with design 102 produced by a hardware engineer that creates HDL files 104 containing the desired circuitry description. Initially, extractor 106 parses HDL files 104 and creates a basic discrete netlist of logic-gate primitives, followed by synthesis 108 phase that optimizes the basic netlist.

Place and route 110 operation follows synthesis 108, and following place and route 110 operation, delay annotation 112 assigns delays to the different gates and wires in the circuit. Timing analysis 114 computes the lengths of paths in the circuits and how the delays relate to the constraints of the circuit, and is followed by assembly operation 116. As a result, CAD tool 124 produces binary file 126 with a description of the circuit to be used during device programming/manufacturing 118 of IC 120. The resulting binary file 126 is stored in non-volatile memory for later retrieval by the device programming or manufacturing process 118. IC 120 is produced during the device programming or manufacturing process 118 according to the instructions, also referred to as layout, for the IC 120 found in design binary file 126. One skilled in the art will appreciate that any commercially available electronic design automation (EDA) tool may utilize the embodiments described herein.

Figure 2:
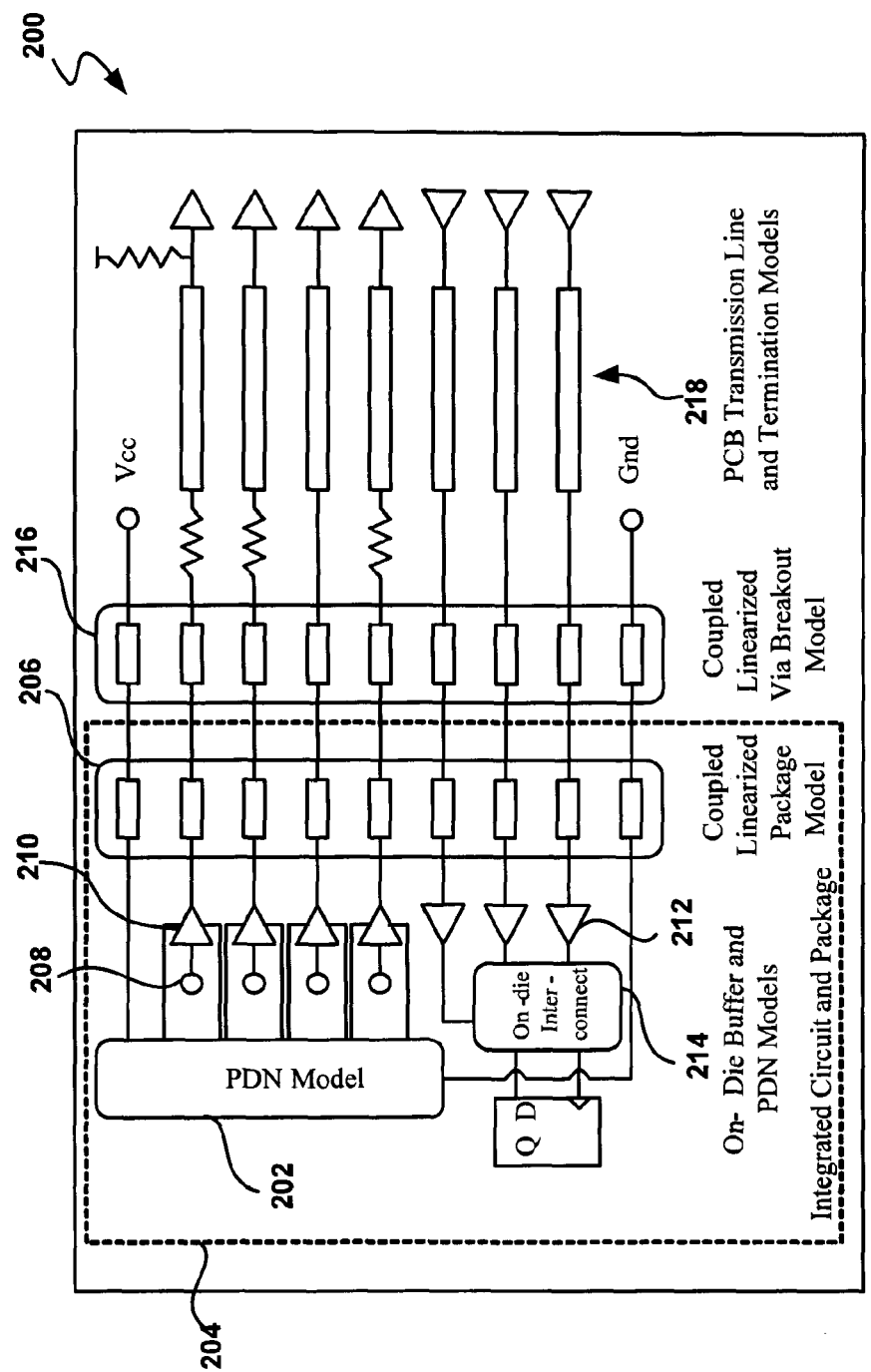
FIG. 2 shows a typical electrical model suitable for SSN simulation according to one embodiment.

FIG. 2 shows a typical electrical model suitable for SSN simulation according to one embodiment. This topology illustrates the different elements that need to be modeled without specifying the exact form of the underlying model. The linear superposition method of SSN simulation is not limited to this topology, but this topology is assumed for discussion purposes. Further details on the linear superposition model may be found in U.S. application Ser. No. 12/034,400, filed on Feb. 20, 2008, and entitled "Simultaneous Switching Noise Analysis Using Superposition Techniques." This Application describes methods that allow the SSN on a victim pin to be calculated through the superposition of many short simulations, each composed of a single aggressor pin switching. In U.S. application Ser. No. 12/419,518, filed on Apr. 7, 2009, and entitled "Circuit Design with Incremental Simultaneous Switching Noise Analysis," a method for determining the SSN on one victim pin allows the reuse of calculations from previous simulations to determine the SSN on various victim pins. This causes a reduction in computation time when determining the SSN on all pins in the design compared to performing full SSN analysis on each victim pin.

The entire signal and power paths of I/O signals are modeled during SSN calculations, both leaving and coming into an integrated circuit of interest. On the left side of FIG. 2, a model for the integrated circuit of interest is presented, and on the right side of FIG. 2, a model of the Printed Circuit Board (PCB) and the off chip I/O buffers is shown. The integrated circuit 204 model consists of both input buffers 212 and output buffers 210. These buffers are connected to the Printed Circuit Board (PCB) through a coupled package model 206. This model is designed to include coupling between signals including return path effects. Each I/O buffer is connected to a Power Distribution Network (PDN) model 202. The purpose of PDN model 202 is to capture any PDN non-idealities that might cause noise. The final piece of the model is an on-die interconnect 214 model. This model is intended to capture any filtering effects that are present on the path between an input buffer and an internal register that eventually samples the input data.

The PCB model consists of a coupled via region breakout model 216 connected to signal transmission lines 218, termination networks, and I/O buffers. Analysis of the via region breakout model 216 is required as the vertical signal path component, below the integrated circuit package, can significantly contribute to SSN noise. As drawn, the model assumes ideal ground return path and no coupling between transmission lines. This is not a requirement for the linear superposition method but rather a simplification to make the discussion easier.

The attenuation effects of a termination network and signal path connected to the victim pin causes the amount of SSN to vary along the different points of the signal path. Modeling the SSN behavior of a device is difficult in general. This problem of modeling SSN behavior becomes more complex when analyzing a Programmable Logic Device (PLD), such as a Field-Programmable Gate Array (FPGA), due to the support of numerous I/O standards, modes, and drive strengths.

Figure 3:
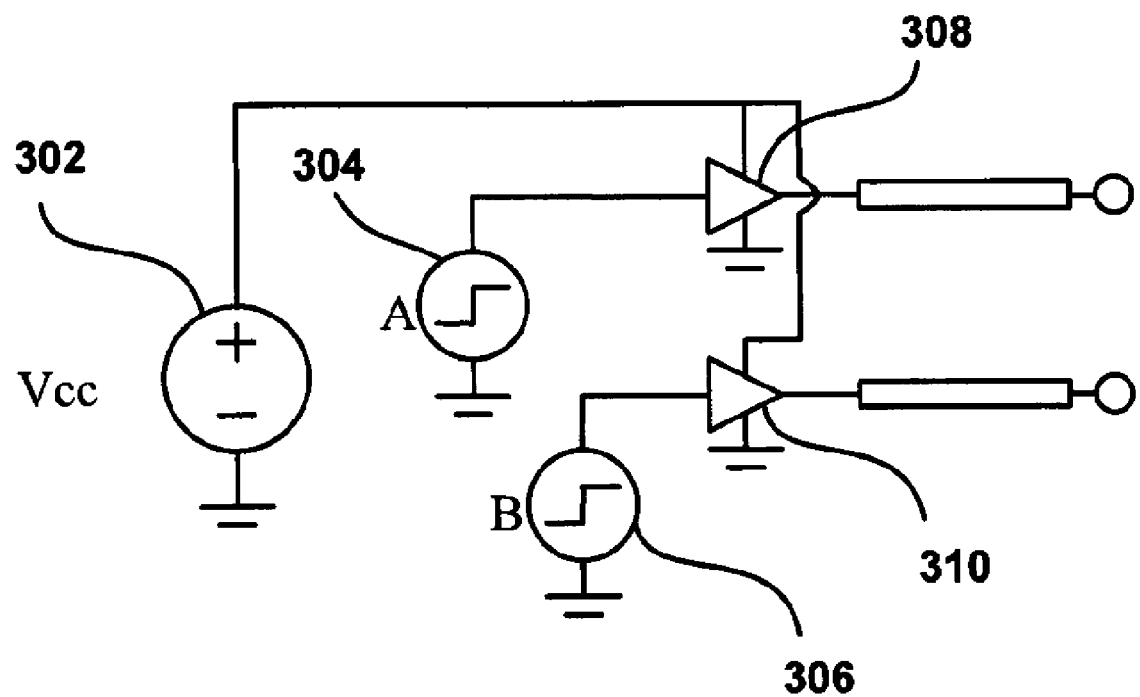
FIG. 3 depicts one embodiment for SSN simulation using extended linear superposition.

FIG. 3 depicts one embodiment for SSN simulation using extended linear superposition. The typical SSN model, such as the one shown in FIG. 2, is not a linear system. Different methods can be used to linearize most of the SSN model components to linear equivalents. The coupled package and via models, PDN, interconnect model, and PCB transmission lines can all be modeled using linear circuit elements with little loss in accuracy. For the purpose of this discussion all these elements are assumed to be linear, either by design or through linearization techniques. This leaves only the I/O buffers themselves as non-linear devices.

The most naïve way to apply linear superposition techniques to this system is to simply apply the methodology assuming that the system is in fact linear. The amount of error that will result from this naïve approach is directly related to how non-linear the system is. Unfortunately, I/O buffers are extremely non-linear, meaning that this method does not perform well. The primary non-linearity of I/O buffers comes from the embedded non-linear transistors and in particular to the gate to source voltage. For output buffers, this voltage is related to a Direct Current (DC) I/O supply rail. Standard linear superposition techniques would force this voltage to zero, effectively putting the I/O buffer transistors into cut-off, a state not linearly related to the typical operating range of I/O buffer transistors. In order to avoid putting the I/O transistors into cut-off, the linear superposition methodology must be extended to allow some supplies to remain nonzero.

The basic idea behind using linear superposition techniques to simulate SSN is to allow the supply voltages to remain nonzero while applying superposition only to the transitioning buffers themselves. By leaving the supply voltage nonzero, the I/O buffers are correctly biased and behave reasonably linearly. This solution solves the non-linearity problem but now causes these non-zero supplies to be counted multiple times. FIG. 3 shows a simple circuit that can be used to illustrate the non-zero supply double counting problem. The circuit models two output buffers 308 and 310, both connected to power supply Vcc 302 and controlled by step stimulus sources A 304 and B 306. Standard linear superposition techniques would perform three simulations, one for each supply, and add the results. The equation below summarizes that linear superposition can not be used by just adding the individual responses for the different sources acting alone.

$$\text{response}(Vcc+A+B) \neq \text{response}(Vcc) + \text{response}(A) + \text{response}(B) \quad (1)$$

As indicated above, this method does not work because the I/O buffers only behave linearly if Vcc is nonzero. The solution to this problem is to perform one simulation with A and Vcc, another one with B and Vcc, and then a third one with Vcc alone. The resulting response is calculated according to the following formula:

$$\text{response}(Vcc+A+B) = \text{response}(Vcc+A) + \text{response}(Vcc+B) - \text{response}(Vcc) \quad (2)$$

Equation (2) is valid under the linear superposition assumption and also insures that the output buffers are in their linear regions since Vcc is never zero. This approach allows SSN simulations of multiple aggressors to be performed independently while correctly biasing the non-linear devices. It should be noted that the method described above implicitly assumes that the victim buffers are all driving low. The reason for this is that the step stimulus sources A and B are forced to zero while not acting as aggressors. The method above can be extended to support victims driving high as follows:

$$\text{response}(Vcc+A+B) = \text{response}(Vcc+A+B\text{high}) + \text{response}(Vcc+B+A\text{high}) - \text{response}(Vcc+B\text{high}+A\text{high}) \quad (3)$$

The correct summation of supplies is calculated while biasing the desired stimulus nodes to the correct value. Performance measurements for one embodiment showed that SSN modeling was accurate for modeling fast I/O buffers, that are only mildly non-linear, but was less accurate for slower I/O buffers, that exhibit more non-linear characteristics. Examination of the slow buffer results showed that much of the accuracy errors were the result of linear approximations applied to the non-stimulus portions of the circuit. In one embodiment of the invention, non-linear effects are introduced as part of the simulation in order to increase the accuracy of the simulations. This method works well because of how the non-linear drive transistors of the I/O buffers are treated.

To better understand non-linear behavior, the source, drain and gates of the drive transistors properties are examined. The sources of transistors are connected directly to Vcc or ground, in this particular simulation, meaning that any non-linear response due to source voltage Vs changes is not relevant. The drain of each transistor has a non-linear relationship with the current through the transistor, but since the SSN noise voltages of interest are reasonably small, the dependence of drain current Id on drain voltage Vd can be considered approximately linear. The remaining node of the transistor, the gate, can not be linearly approximated as the current is strongly non-linearly related to gate voltage Vg.

To better understand this relation, it is helpful to consider both the active driver and the quiet driver separately. For an active driver in a component superposition simulation, say response(Vcc+A), the desired outcome is to have the buffer inject the correct current waveform into the coupled linear system model and also present the correct output impedance to the system such that any reflections are correct. Given that Vs and Vd are reasonably linear, the only voltage of concern is Vg.

It needs to be determined whether any other component superposition simulations can induce enough voltage change on driver A's gate to change either the buffer A's injected current or the output impedance. The only path from any coupled pin noise is through the gate-drain capacitance Cgd of the drive transistors, and the gate is most non-linear in the immediate region around threshold voltage Vth. While it is possible that noise from another buffer can change the gate voltage of a victim buffer, experimentation has shown that this is not a significant problem in practice. Unfortunately, this is not the case for the quiet pins in a component superposition simulation.

During the component simulation for active driver A, response(vcc+A), buffer B's is being driven to a constant value. This means that the buffer will effectively act as a linear impedance, since Vs is fixed, Vg is driven by the predrivers to a constant value and Vd is small. This is quite different than what actually happens when a driver switches, as seen in FIG. 4.

Figure 4:
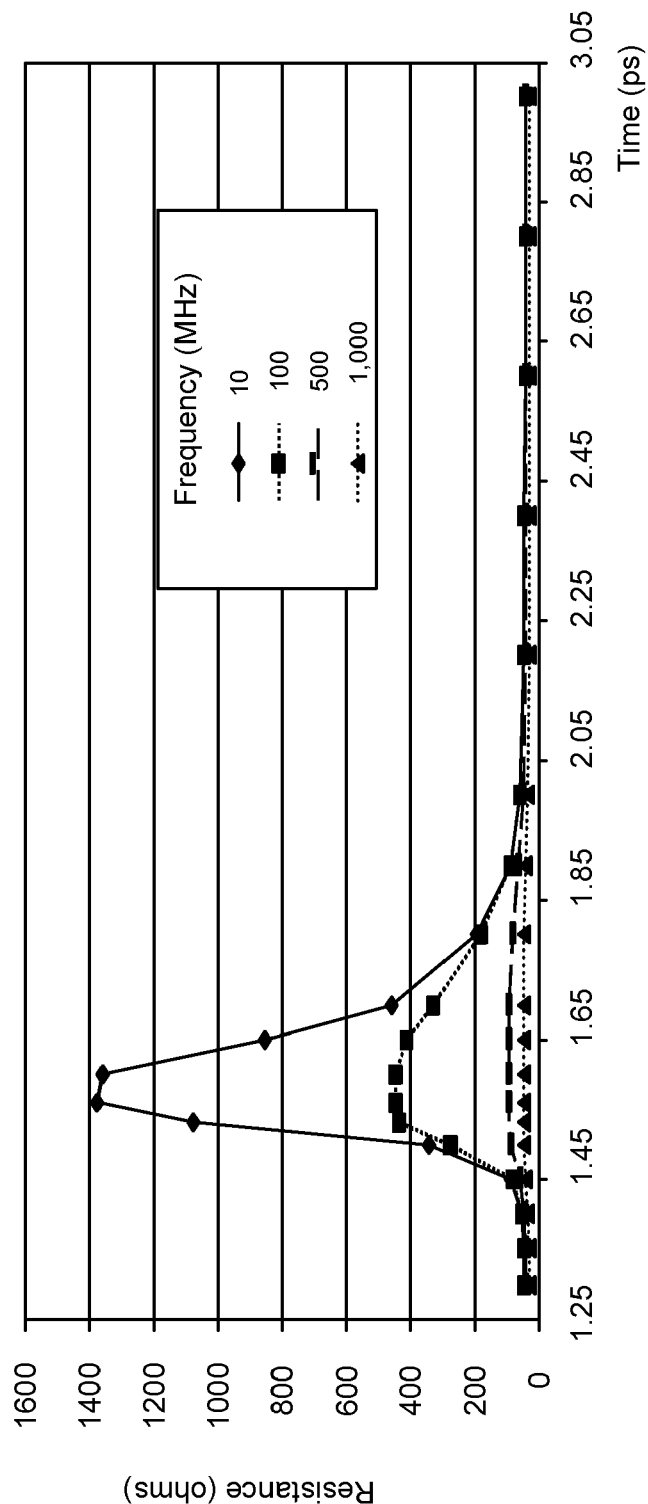
FIG. 4 illustrates a switching I/O buffer's time-varying impedance.

FIG. 4 illustrates a switching I/O buffer's time-varying impedance. Each line in the graph represents the time varying impedance at a specified frequency. Initially, the buffer has output impedance around 30Ω. As the buffer starts to switch, the pull down legs are turned off and the impedance rises. Eventually, the pull-up legs are engaged and the impedance returns to a steady state value around 30Ω. Thus, a single linear resistor is not a good approximation and simulating the buffer with a linear resistor will result in incorrect reflections in each of the component SSN simulations. The different lines in the chart correspond to different frequencies of the traveling waveforms in the transmission line.

It may seem that the results above cast doubt on the ability to use superposition to simulate SSN, but this is not actually the case. For most fast I/O standards the impedance change occurs very quickly and has a limited magnitude. This means that only a small error is introduced. For slower I/O standards the impedance change can be significant and does introduce error, but since this error only affects the reflection coefficient of the quiet buffers in component superposition simulation, the technique can still yield useful results with lower accuracy. Embodiments of the invention provide for the reduction of this error due to non-linear behavior.

Figure 5:
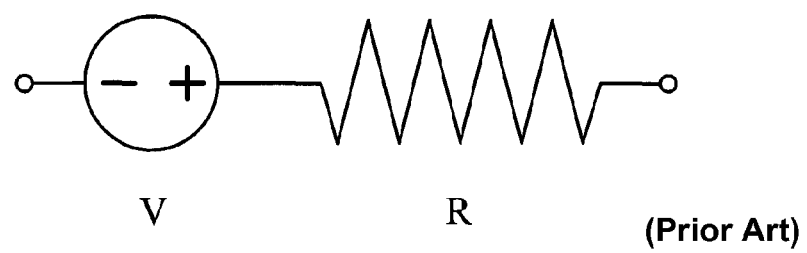
FIG. 5 depicts the creation of a model for simulating a non-linear device in accordance with one embodiment.

FIG. 5 depicts the creation of a model for simulating a non-linear device in accordance with one embodiment. The non-linear behavior problem can be resolved by introducing a new type of simulation device into a circuit simulator. The purpose of this device is to present the correct time varying impedance to the coupled linear system portion of the circuit such that any noise reflections are correct. Effectively, this device replaces the non-switching aggressors in each component superposition simulation. One other important constraint is that this new device can not inject its own current into the system as the impedance of the new device changes, since this would violate the superposition principle of having all sources in the non-switching aggressors constant. The model of FIG. 5 includes a voltage source V and a resistor R connected in series.

If resistor R were considered to be time varying and voltage source V to be constant, then the net result would be that the device had a time varying impedance, and that the device injected current as the resistance changed. In order to avoid this current injection, the behavior of the device, the resistor R, and the voltage source V are configured to change over time. The method to assign the changing values to R and V is shown in FIG. 6.

Figure 6:
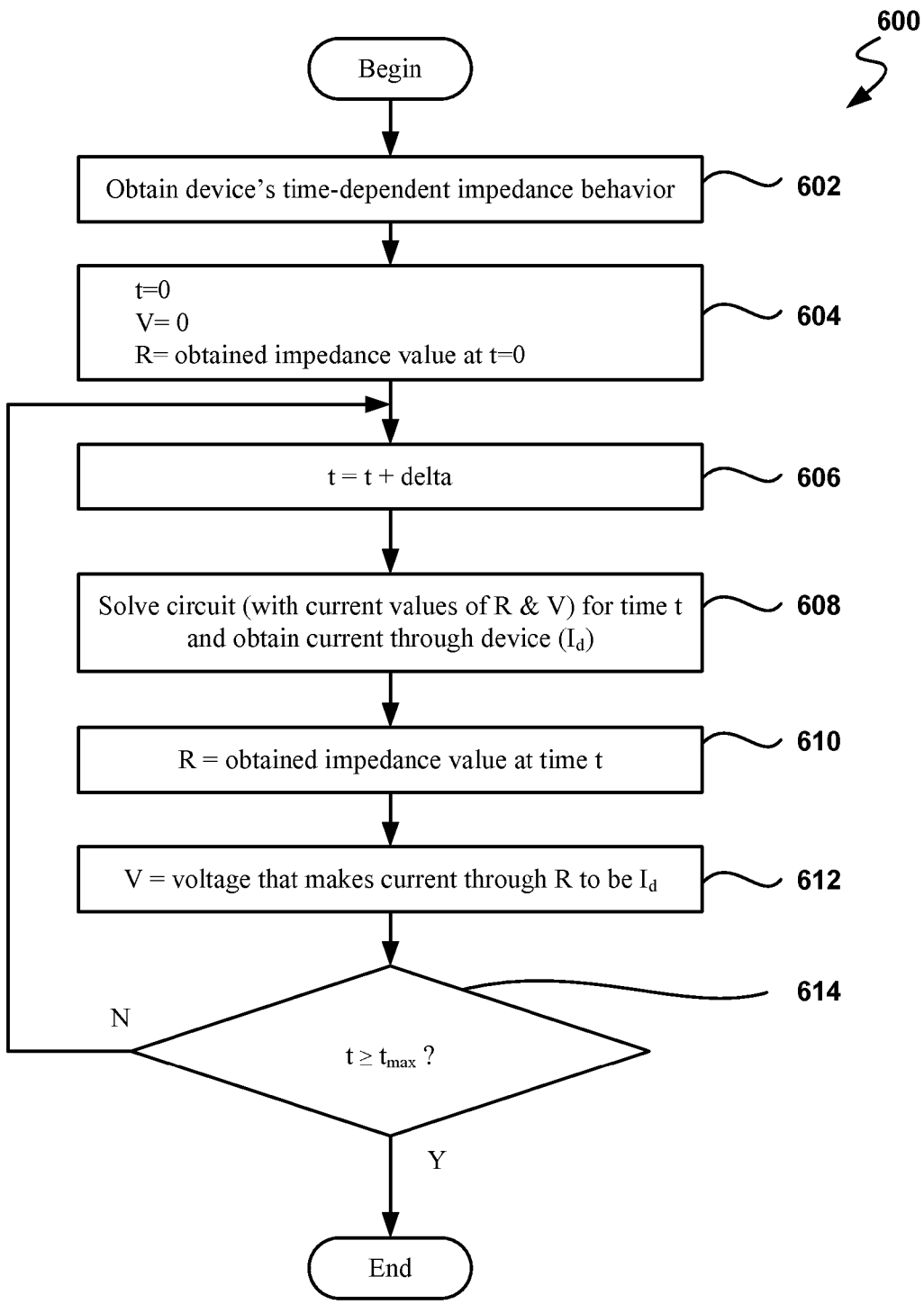
FIG. 6 includes a flow chart of an embodiment for creating a model to simulate a non-linear device.

FIG. 6 includes a flow chart of an embodiment for creating a model to simulate a non-linear device. In operation 602, the device's time-dependent impedance values are obtained. In one embodiment, the time varying impedance of a switching buffer is determined by performing a transient simulation of the switching buffer driving a transmission line and termination network and recording the nodal voltages. The nodal voltages at each timestep are then be used to perform a small signal AC analysis of the buffer and the instantaneous input impedance can be measured. The values for the time-dependent impedance can also be obtained from a library of previously stored values, results from previous simulations, etc.

In operation 604, the starting values at time t=0 are set. The variable voltage value V is set to 0, and the device's impedance value R is set to the value obtained in operation 602 for the impedance value at time 0. In operation 606 time counter t is incremented by a delta value. The delta value depends on the simulation tool used and is configured to bound a maximum amount of error due to the time increment. The delta value can also be manually configured by the user in one embodiment. In another embodiment the delta parameter is in the order of picoseconds, but other values are also possible.

In operation 608, the circuit is solved for the time defined in operation 606, that is, a simulation of the circuit is performed with the current values of R and V. The simulation determines a current $I_d$ flowing through the device. The value of R is updated in operation 610 by assigning to R the corresponding value for time t obtained in operation 602. The value of V is updated in operation 612, such that the new value of V makes the current flowing through R be equal to the current $I_d$ obtained in the simulation. In operation 614 the method checks whether there are more timesteps left in the simulation. If $t \geq t_{max}$ then the method ends, and otherwise the method flows back to operation 606 and repeats as described above. Parameter $t_{max}$ is set as the maximum time for which the simulation of the IC is performed. This method insures that at each timestep there is a single linear resistance, while allowing the resistance to change between timesteps in a way that the device does not inject any new current due to the resistance adjustment.

The device of FIG. 5 described above can be used to improve the accuracy of superposition-based SSN simulations. In particular, the device improves the reflection coefficient of aggressor buffers that are being held quiet during a particular superposition simulation. In one embodiment, a method is used to estimate the time varying impedance of a switching buffer and then, in a component superposition simulation, replacing the quiet aggressor buffers with a linear time varying impedance device whose R(t) is set to the estimated impedance determined previously.

Figure 7A:
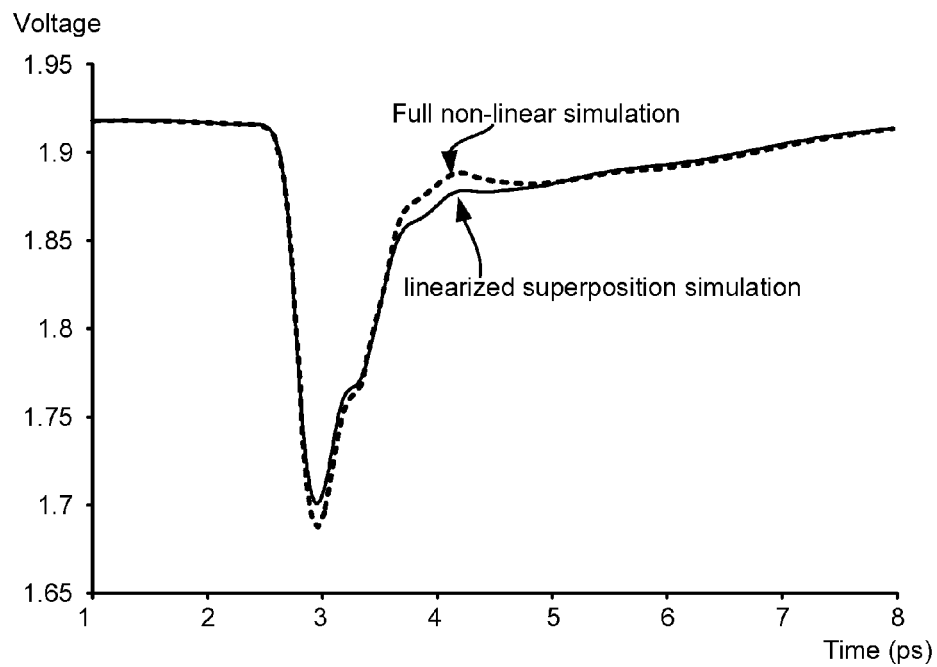
FIGS. 7A-B illustrate results obtained for the different performance simulation methods, according to one embodiment.
Figure 7B:
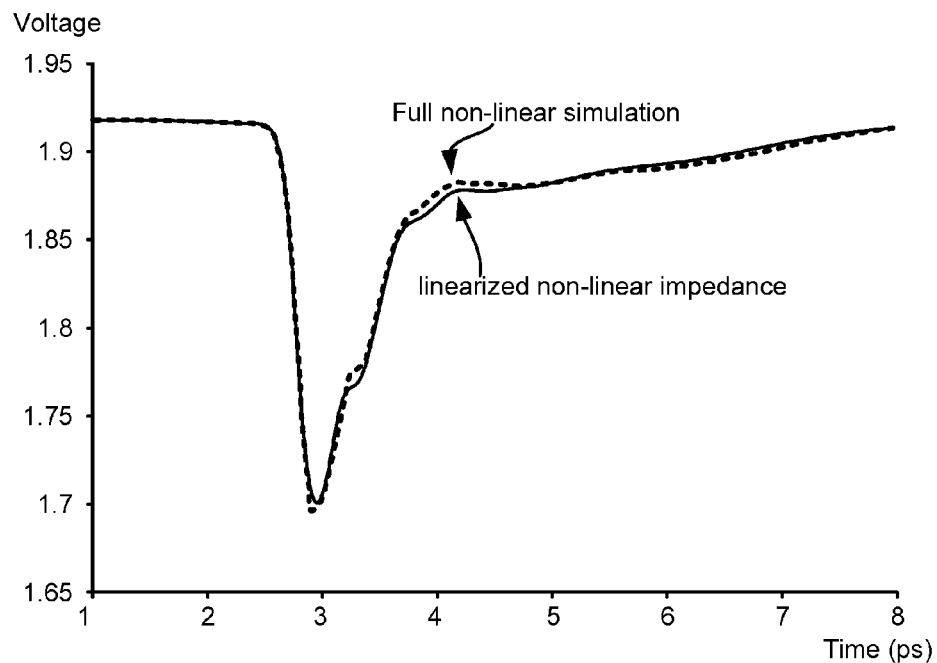

FIGS. 7A-B illustrate results obtained for the different performance simulation methods, according to one embodiment. FIG. 7A shows both a SSN simulation performed with linear superposition techniques and a full SSN simulation (without linear superposition) for a four-aggressor case with a slow slew rate driver. The dotted line represents the transient simulation result obtained by performing a full SSN simulation and the solid line represents the result obtained by performing a superposition based simulation. It can be seen that the superposition technique is under predicting the amount of SSN noise.

FIG. 7B shows a comparison between a full SSN simulation and a superposition simulation using a linearized time-varying-impedance device for all quiet aggressor buffers. The SSN simulation with the time-varying-impedance produces results with higher accuracy than that of the straight linear superposition simulation of FIG. 7A.

Figure 8:
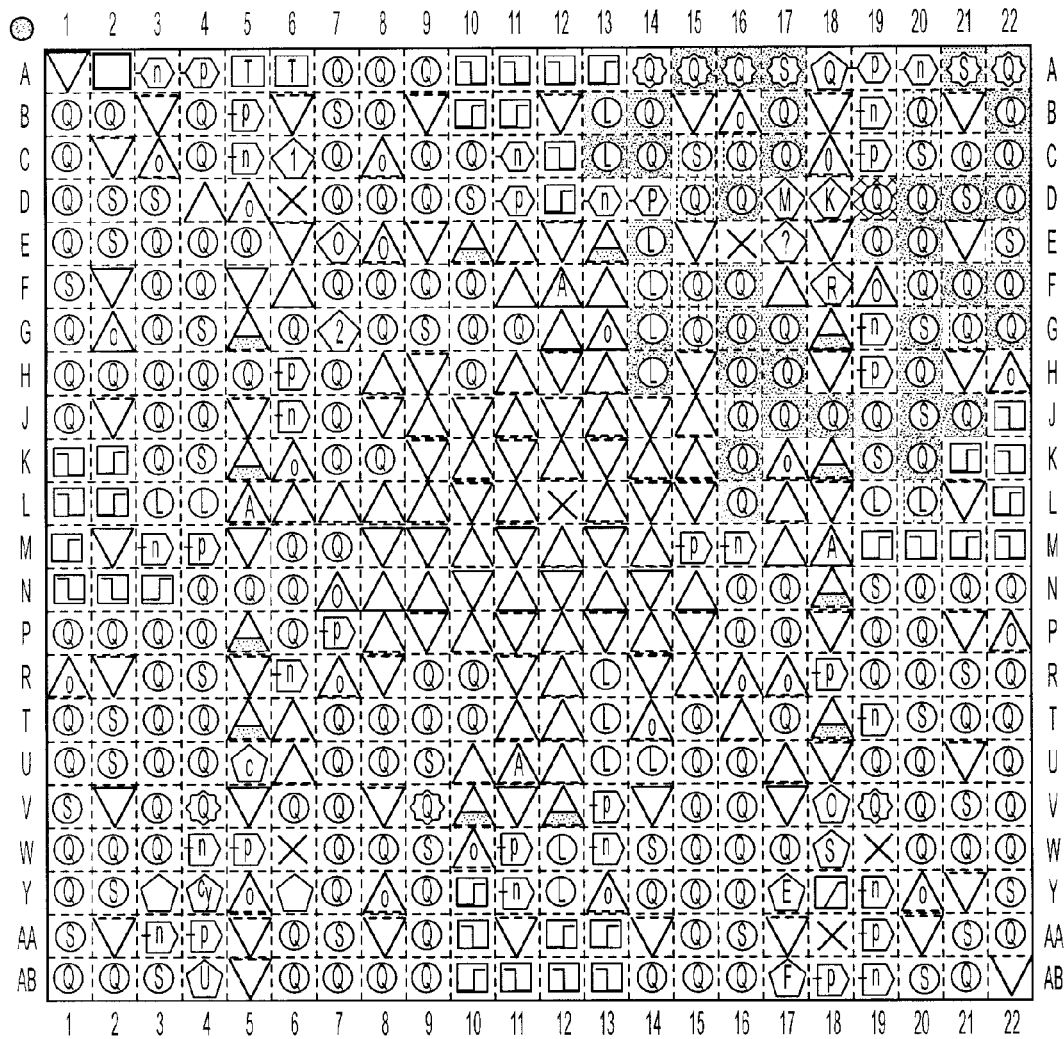
FIG. 8 is a graphical representation of calculated SSN for the pins of an electronic component according to one embodiment.

FIG. 8 is graphical representation of calculated SSN for the pins of an electronic component according to one embodiment. In this embodiment, a matrix representation of the different I/O pins on the device shows the level of noise at different pins by using different colors and shading intensity. In this example, SSN is more intense on the pins in the top right corner, thereby suggesting a relocation of some of these I/O pins to different physical locations in the electronic component to decrease the interference of aggressor pins. This representation is shown as way of example, but other representations are possible using different layouts, icons, colors, shadings, etc., as long as the functionality described herein is maintained. The representation can be shown on a monitor for a user.

Figure 9:
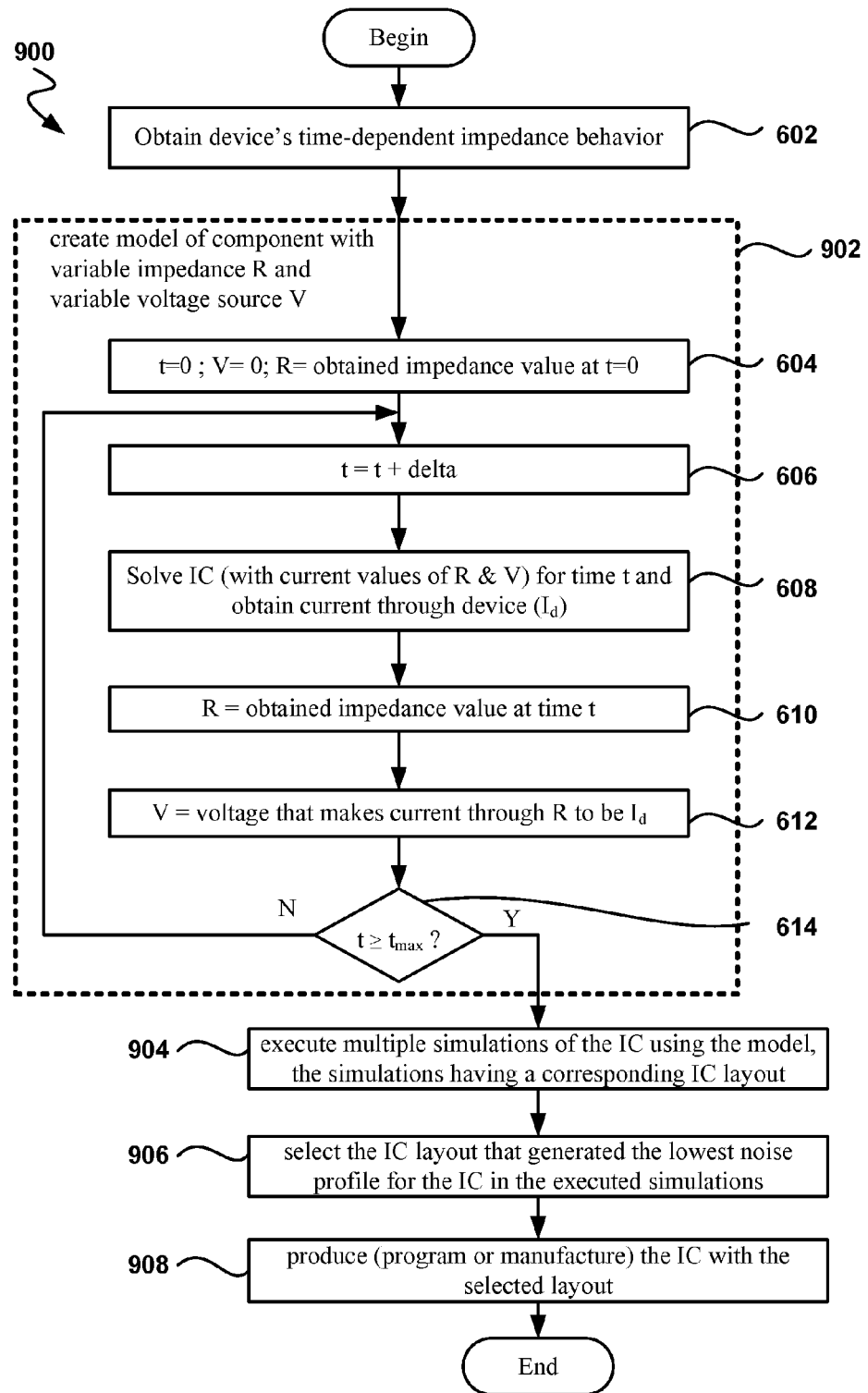
FIG. 9 includes a flow chart for producing an IC containing an electronic component with time-dependent impedance, according to one embodiment.

FIG. 9 includes a flow chart for producing an IC containing an electronic component with time-dependent impedance, according to one embodiment. The method depicted in FIG. 9 includes some operations previously described in reference to FIG. 6. In operation 602, the component's time-dependent impedance values are obtained, and afterwards the method flows to operation 902 where a model of the component, sometimes referred to as time-dependent device, is created. The model includes a variable impedance R and a variable voltage source V. Operation 902 includes operations 604-614 of FIG. 6. In operation 604, the starting values at time t=0 are set. The variable voltage value V is set to 0, and the component's impedance value R is set to the obtained value in operation 602 for the impedance value at time 0. In operation 606, time counter t is incremented by a delta value. The delta value depends on the simulation tool used and is configured to bound a maximum amount of error due to the time increment between solving the IC, as described in operation 608 where a simulation of the circuit is performed with the current values of R and V. The simulation determines, among other results, the value of current $I_d$ flowing through the electronic component.

The value of R is updated in operation 610 by assigning to R the corresponding value for time t obtained in operation 602. The value of V is updated in operation 612, such that the new value of V makes the current flowing through R be equal to current $I_d$ obtained in the simulation. In operation 614, the method checks whether there are more timesteps left in the simulation. If $t \geq t_{max}$ then the method proceeds to operation 904 where multiple simulations of the IC are executed using the model, and otherwise the method flows back to operation 606.

Each of the multiple simulations in operation 904 has a corresponding layout or configuration for the IC. The layout that produced the best results in the simulations is selected in operation 906 to create a design for the IC. Different embodiments use different criteria for defining which is the best result from the results obtained in the multiple simulations. Generally speaking, we refer to the best result as the result that generates the lowest noise profile for the IC. The noise profile is a global measure of noise for the IC that accounts for the noise in the different components of the IC. In one embodiment, the best result is the one that produces the lowest amount of average noise on I/O pins. In another embodiment, the best result corresponds to the configuration that has the highest margin of noise in the pin with the lowest margin of noise from an acceptable amount of noise in each pin. In yet another embodiment, a user determines which of the simulations generates the best results. The person skilled in the art will readily appreciate different criteria to select the best configuration based on the noise injected on I/O pins. The selected configuration is used in operation 908 to produce the IC by programming or manufacturing the IC.

Figure 10:
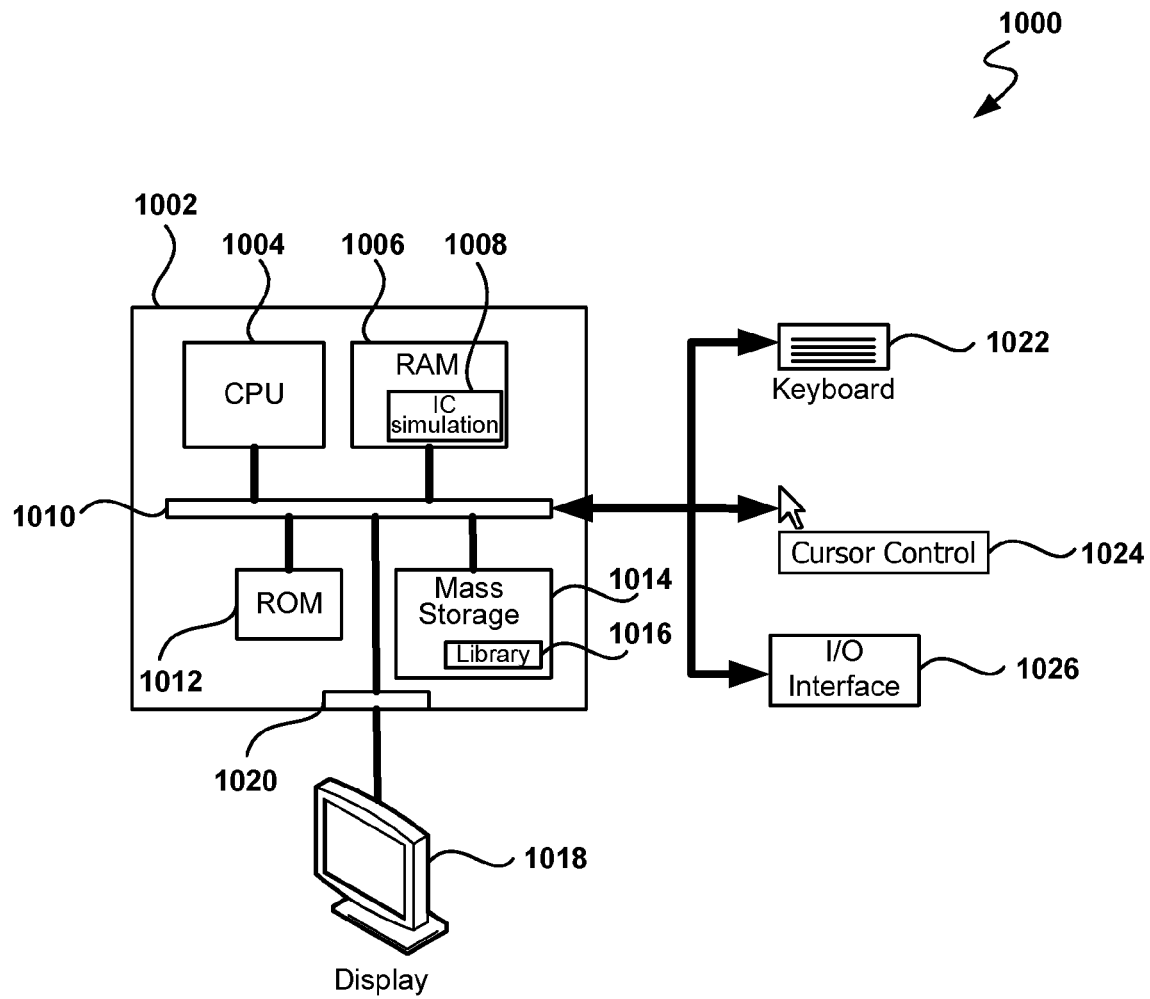
FIG. 10 is a simplified schematic diagram of a computer system for implementing embodiments of the present invention.

FIG. 10 is a simplified schematic diagram of computer system 1000 for implementing embodiments of the present invention. It should be appreciated that the methods described herein may be performed with a digital processing system, such as a conventional, general-purpose computer system. Special purpose computers, which are designed or programmed to perform only one function may be used in the alternative. In addition, the computer system of FIG. 10 may be used to perform IC simulations. The computer system includes a central processing unit (CPU) 1004, which is coupled through bus 1010 to random access memory (RAM) 1006, read-only memory (ROM) 1012, and mass storage device 1014. IC simulation program 1008 resides in random access memory (RAM) 1006, but can also reside in mass storage 1014.

Mass storage device 1014 represents a persistent data storage device such as a floppy disc drive or a fixed disc drive, which may be local or remote. IC simulation model 1016 resides in mass storage device 1014, but can also reside in RAM 1006 during processing. Model 1016 may contain circuit models for performing IC simulations. It should be appreciated that CPU 1004 may be embodied in a general-purpose processor, a special purpose processor, or a specially programmed logic device. Display 1018 is in communication with CPU 1004, RAM 1006, ROM 1012, and mass storage device 1014, through bus 1010 and display interface 1020. Of course, display 1018 is configured to display the user interfaces described herein. Keyboard 1022, cursor control 1024, and input/output interface 1026 are coupled to bus 1010 in order to communicate information in command selections to CPU 1004. It should be appreciated that data to and from external devices may be communicated through input output interface 1026.

The methods computer programs and systems for producing an IC containing an electronic component with time-dependent impedance, described herein may be incorporated into any suitable integrated circuit. For example, the methods, computer programs and systems may be incorporated into other types of programmable logic devices such as programmable array logic (PAL), programmable logic array (PLA), field-programmable gate array (FPGA), field programmable logic array (FPLA), electrically programmable logic devices (EPLD), electrically erasable programmable logic device (EEPLD), logic cell array (LCA), application-specific integrated circuit (ASIC) just to name a few. The programmable logic device may be a part of a data processing system that includes one or more of the following components: a processor, memory; I/O circuitry, and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. In one embodiment, the apparatus can be specially constructed for the required purpose (e.g. a special purpose machine), or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations. The apparatus thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for producing an integrated circuit (IC) containing a time-dependent-impedance component, the method comprising:
    obtaining time-dependent impedance values for the component;
    creating a model of the component, the model including a variable impedance and a variable voltage source, the creating the model including,
        determining a value of a current flowing through the component based on a first time-dependent impedance value assigned to the variable impedance and a first voltage value assigned to the variable voltage source;
        assigning a second time-dependent impedance value to the variable impedance, and
        avoiding injection of current into the model by assigning a second voltage value to the variable voltage source such that a current through the component is equal to the determined value of the current flowing through component before assigning the second time-dependent impedance value to the variable impedance;
    executing multiple simulations of the IC using the model, each of the multiple simulations having a corresponding IC layout; and
    selecting an IC layout that generated a lowest noise profile for the IC in the executed multiple simulations.

2. The method of claim 1, wherein obtaining time-dependent impedance values further includes,
    performing a simulation of the component;
    recording nodal voltages at the component over a plurality of sampling periods; and calculating an impedance value for each sampling period based on the recorded nodal voltages.

3. The method of claim 1, wherein creating a model further includes, repeating for a plurality of time periods the operations of,
solving the IC for each time period from the plurality of time periods to get a solved value of the current through the component,
setting an impedance value for each time period to be equal to a corresponding time-dependent impedance value; and
setting a voltage value for the variable voltage source in each time period such that the current through the component is equal to the solved value before setting the impedance value.

4. The method of claim 3, wherein creating a model further includes,
setting the impedance value in a first period from the plurality of time periods equal to a first obtained time-dependent impedance value; and
setting the variable voltage source value to 0 in the first period.

5. The method of claim 3, wherein each time period has a duration of a delta value, the delta value being configured to bound a maximum amount of error in solving the IC.

6. The method of claim 1, wherein a source of the variable impedance and the variable voltage source in the model are serially coupled.

7. The method of claim 1, wherein the executed multiple simulations calculate Simultaneous Switching Noise (SSN) on Input/Output (JO) pins of the IC.

8. The method of claim 7, wherein SSN is calculated in the multiple simulations using linear superposition, wherein the model of the component is used to replace non-switching aggressor buffers while calculating SSN.

9. The method of claim 1, comprising:
manufacturing the IC.

10. The method of claim 1, further including,
repeating the creating a model for a plurality of waveform frequencies through the component.

11. A tangible computer-readable storage medium storing a computer program for producing an integrated circuit (IC), which when executed by one or more processors causes the processors to create a model of the component, the model including a variable impedance and a variable voltage source;
determine a value of a current flowing through component based on a first time-dependent impedance value assigned to the variable impedance and a first voltage value assigned to the variable voltage source;
assign a second time-dependent impedance value to the variable impedance;
avoid injection of current into the model by assigning a second voltage value to the variable voltage source such that a current through the component is equal to the determined value of the current flowing through the component before assigning the second time-dependent impedance value to the variable impedance;
execute multiple simulations of the IC using the model, each of the multiple simulations having a corresponding IC layout; and
select an IC layout that generated a lowest noise profile for the IC in the executed multiple simulations.

12. The tangible computer-readable storage medium of claim 11, wherein the one or more processors are further configured to:
obtain time-dependent impedance values for the component, wherein the first value and second value assigned to the variable impedance are based on the obtained impedance values.

13. The tangible computer-readable storage medium of claim 11, wherein the multiple simulations calculate Simultaneous Switching Noise (SSN) on Input/Output (IO) pins of the IC.

14. The tangible computer-readable storage medium of claim 13, wherein SSN is calculated in the multiple simulations using linear superposition.

15. The tangible computer-readable storage medium of claim 14, wherein the multiple simulations except for a first executed simulation use calculation results from previously executed simulations.

16. A method for designing an integrated circuit (IC), the method comprising:
creating a model of a component, the model including a variable impedance and a variable voltage source, the creating the model including:
determining a value of a current flowing through the component based on a first time-dependent impedance value assigned to the variable impedance and a first voltage value assigned to the variable voltage source;
assigning a second time-dependent impedance value to the variable impedance; and
avoiding injection of current into the model by assigning a second voltage value to the variable voltage source such that a current through the component is equal to the determined value of the current flowing through the component before assigning the second time-dependent impedance value to the variable impedance;
executing a first simulation of the IC using the model and a first configuration of the IC;
executing a second simulation of the IC using the model and a second configuration of the IC; and
selecting a design for the IC based on results from the first simulation and the second simulation.

17. The method of claim 16, wherein creating a model further includes,
for a plurality of time periods repeatedly calculating a solved value of the current through the component,
setting an impedance value for each time period to be equal to a corresponding previously obtained time-dependent impedance value, and
setting a voltage value for the variable voltage source in each time period such that the current through the component is equal to the solved value before setting the impedance value.

18. The method of claim 16, wherein the first simulation and the second simulation include calculating SSN on IO pins.

19. The method of claim 18, wherein the first simulation and the second simulation use linear superposition for calculating SSN on IO pins, wherein the model of the component is used to replace non-switching aggressor buffers during the first simulation and the second simulation.

20. The method of claim 19, wherein SSN is calculated in the first simulation and the second simulation using linear superposition.

* * * * *